(12) United States Patent
Deng

(10) Patent No.: US 12,267,034 B2
(45) Date of Patent: Apr. 1, 2025

(54) PULSE WIDTH MODULATION SIGNAL SYNTHESIS FOR A MOTOR CONTROLLER

(71) Applicant: TEXAS INSTRUMENTS INCORPORATED, Dallas, TX (US)

(72) Inventor: Suixiang Deng, Zhuhai (CN)

(73) Assignee: Texas Instruments Incorporated, Dallas, TX (US)

( * ) Notice: Subject to any disclaimer, the term of this patent is extended or adjusted under 35 U.S.C. 154(b) by 158 days.

(21) Appl. No.: 17/841,750

(22) Filed: Jun. 16, 2022

(65) Prior Publication Data

US 2023/0283218 A1 Sep. 7, 2023

Related U.S. Application Data

(60) Provisional application No. 63/315,691, filed on Mar. 2, 2022.

(51) Int. Cl.
*H02P 27/08* (2006.01)
*H02M 7/5395* (2006.01)

(52) U.S. Cl.
CPC ........ *H02P 27/085* (2013.01); *H02M 7/5395* (2013.01)

(58) Field of Classification Search
CPC ...... H02P 27/08; H02P 27/085; H02M 7/5395
See application file for complete search history.

(56) References Cited

U.S. PATENT DOCUMENTS

| | | | | |
|---|---|---|---|---|
| 5,712,540 A * | 1/1998 | Toda | ........................ | F24F 11/88 318/46 |
| 8,680,794 B2 * | 3/2014 | Kazama | ................... | B60L 1/003 318/85 |
| 8,836,270 B2 * | 9/2014 | Kajiura | ................. | H02M 7/493 318/599 |
| 9,231,513 B2 * | 1/2016 | Baba | ........................ | H02P 25/22 |
| 10,612,797 B2 * | 4/2020 | Hashimoto | .............. | F24F 11/88 |
| 2015/0022129 A1 | 1/2015 | Lu et al. | | |

\* cited by examiner

*Primary Examiner* — Rina I Duda
(74) *Attorney, Agent, or Firm* — Xianghui Huang; Frank D. Cimino

(57) ABSTRACT

In response to a rising edge on an input pulse width modulation (PWM) signal, a method includes starting a first counter, resetting a second counter, and forcing a second PWM signal to a logic low level. In response to the first counter reaching a first match value, the method includes asserting a rising edge on a first PWM signal. In response to a falling edge on the input PWM signal, the method further includes causing a falling edge of the first PWM signal, resetting the first counter, and starting the second counter. In response to the second counter reaching a second match value, the method includes asserting a rising edge of the second PWM signal.

16 Claims, 4 Drawing Sheets

PULSE WIDTH MODULATION SIGNAL SYNTHESIS FOR A MOTOR CONTROLLER

CROSS-REFERENCE TO RELATED APPLICATIONS

This application claims priority to U.S. Provisional Application No. 63/315,691, filed Mar. 2, 2022, which is hereby incorporated by reference.

BACKGROUND

Many types and configurations of electric motors are available including, for example, direct current (DC) motors and alternating current (AC) motors. AC motors are available in various types as well including, for example, three-phase motors. A three-phase motor includes three pairs of stator windings. Three sinusoidal currents, one for each pair of stator windings, are generated by, for example, a DC-to-AC inverter. The three sinusoidal currents are 120 degrees out-of-phase with respect to each other. In some configurations, the inverter includes a power transistor pair for each of the three phases of the motor, A pair of complementary pulse width modulation (PWM) signals controls the ON/OFF states of the transistors of each complementary pair. For a three-phase motor, three pairs of PWM signals (six PWM signals) are generated and used to control the inverter's transistors.

SUMMARY

In at least one embodiment, an integrated circuit (IC) includes a pulse width modulation (PWM) generator configured to generate a first PWM signal. A first counter has a first control input and a first reset input. The first control input is configured to receive the first PWM signal, and the reset input is configured to receive a logical inverse of the first PWM signal. The first counter has a first counter output. A second counter has a second control input and a second reset input. The second control input is configured to receive the logical inverse of the first PWM signal, and the reset input is configured to receive the first PWM signal. The second counter has a second counter output. A first logic circuit has a first logic circuit input and a second logic circuit input. The first logic circuit input is coupled to the first counter output, and the second logic circuit input is configured to receive the first PWM signal. The first logic circuit has a first logic circuit output configured to provide a second PWM signal. A second logic circuit has a third logic circuit input and a fourth logic circuit input. The third logic circuit input is coupled to the second counter output, and the fourth logic circuit input is configured to receive the logical inverse of the first PWM signal. The second logic circuit has a second logic circuit output configured to provide a third PWM signal.

In another embodiment, in response to a rising edge on an input pulse width modulation (PWM) signal, a method includes starting a first counter, resetting a second counter, and forcing a second PWM signal to a logic low level. In response to the first counter reaching a first match value, the method includes asserting a rising edge on a first PWM signal. In response to a falling edge on the input PWM signal, the method further includes causing a falling edge of the first PWM signal, resetting the first counter, and starting the second counter. In response to the second counter reaching a second match value, the method includes asserting a rising edge of the second PWM signal.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

As described above, a three-phase motor is controlled using six, complementary pairs of PWM signals. Some applications include three, three-phase motors, an example of which includes air-conditioning systems which may include a compressor and two fans. To control all three, three-phase motors, 18 PWM signals are needed. It would be advantageous to have one integrated circuit (IC) that includes a controller capable of producing the needed number of PWM signals. The embodiments described herein pertain to a controller that includes PWM modules capable of generating some, but not all, of the needed PWM signals as well as a PWM synthesis circuit that synthesizes an additional PWM signal from one of the PWM signals generated by a PWM module. In one example, a controller includes eight PWM modules, and each PWM module is configured to generate a pair of complementary PWM signals. Thus, the eight PWM modules generate 16 PWM signals. The PWM synthesis circuit produces an additional complementary pair of PWM signals based on one of the module's output PWM signals. The PWM synthesis circuit also ensures that sufficient dead time is introduced in the synthesized pair of PWM signal to avoid a "shoot through" current between a supply voltage rail and ground (described below).

Figure 1:
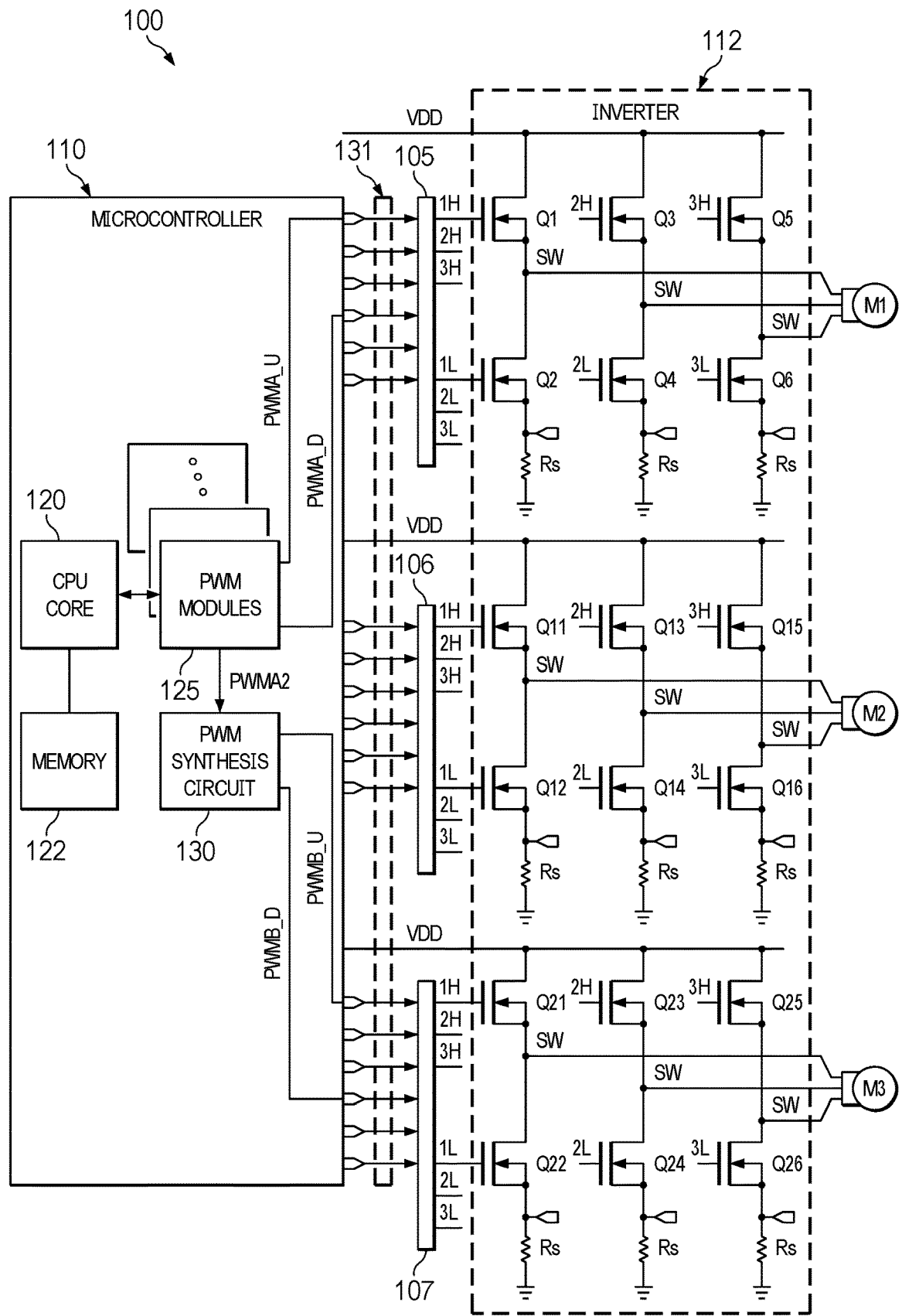
FIG. 1 is a diagram of a system in which three, three-phase motors are controlled by a single microcontroller, in accordance with an example.

FIG. 1 is schematic diagram of a system 100 which includes a microcontroller 110, an inverter 112, and three motors M1, M2, and M3. In this embodiment, each motor is a three-phase motor. Accordingly, system 100 includes three, three-phase motors M1-M3. The microcontroller 110 in this example generates enough PWM signals 131 to control all three, three-phase motors M1-M3. The principles described herein, however, can be extended to any number of motors and/or motors with a number of phases other than three.

The inverter 112 includes transistors Q1-Q6, Q11-Q16, and Q21-Q26. The transistors shown in FIG. 1 are n-channel field effect transistors (NFETs). The transistors of the inverter 112 are configured as a separate pair of transistors for each of the three phases for each motor M1-M3. For example, transistors Q1 and Q2 are a transistor pair of one phase of motor M1, and transistors Q3/Q4 and Q5/Q6 are transistor pairs of two other phases of motor M1. Similarly, each of the three transistor pairs Q11/Q12, Q13/Q14, and Q15/Q16 correspond to a separate phase of the three-phase motor M2. Each of the three transistor pairs Q21/Q22, Q23/Q24, and Q25/Q26 correspond to a separate phase of the three-phase motor M3.

Each transistor pair is coupled in series between a supply voltage VDD and ground. For example, the drain of transistor Q1 is coupled to VDD, and the source of transistor Q1 is coupled to the drain of transistor Q2 at a switch node (SW). The source of transistor Q2 is coupled through a sense resistor Rs to ground. The other pairs of transistors Q3/Q4, Q5/Q6, Q11/Q12, Q13/Q14, Q15/Q16, Q21/Q22, Q23/Q24, and Q25/Q26 are similarly configured—each transistor pair coupled between VDD and a sense resistor Rs to ground and each transistor pair having a switch node (SW).

Each switch node SW is coupled to a corresponding coil within the respective three-phase motor. The microcontroller 110 includes one or more central processing unit (CPU) cores 120, memory 122, PWM modules 125, and at least one instantiation of a PWM synthesis circuit 130. In one embodiment, the CPU core(s) 120, memory 122, PWM modules 125, and PWM synthesis circuit 130 are fabricated on a single integrated circuit (IC), although in other embodiments, two or more or more of the components shown in FIG. 1 as being part of the microcontroller can be fabricated on separate ICs.

The PWM modules 125 generate PWM control signals to control the ON/OFF state of one of the transistors. In one embodiment, each PWM module 125 generates a complementary pair of PWM signals to control the ON/OFF state of one of the transistor pairs. For example, one of the PWM modules 125 generates PWM signals PWMA_U and PWMA_D. PWMA_U controls transistor Q1 and PWMA_D controls transistor Q2. The reference to "U" refers to the transistors connected to VDD being the "UP" transistors (sometimes referred to as the high side transistors), and the reference to "D" refers to the transistors connected to ground being the "DOWN" transistors (also called the low side transistors). The PWM module 125 generates its PWM signals in such a manner that, at any point in time, either the UP transistor or the DOWN transistor is ON, but not both. If both the UP and DOWN transistors were on at the same time, a high level of current (also called a shoot-through current) would flow from VDD to ground thereby potentially damaging the transistors. Accordingly, the PWM modules 125 insert a dead-time between transitions of the logic states of the PWM signals. Each PWM module 125 varies the duty cycle of its PWM signals in an approximately sinusoidal manner to thereby produce an approximately sinusoidal current in the respective motor's coil. The CPU core 120 controls the PWM modules 125 so that the PWM modules that generate the PWM signals 131 for a given motor M1-M3 cause those PWM modules to implement a sinusoidally-varying duty cycle that is approximately 120 degrees phase-shifted between each phase of the motor.

FIG. 1 also shows driver circuits 105, 106, and 107 coupled between the microcontroller 110 and the gates of the transistors Q1-Q6, Q11-Q16, and Q21-Q26. Each driver circuit includes a driver whose input is one of the PWM signals 131 and whose output is a voltage and current sufficient to turn ON and OFF the respective transistor.

The inverter 112 in this example includes six transistors to control each of the three-phase motors M1-M3. That being the case, the microcontroller 110 generates six PWM signals 131 to control each motor. With three such motors M1-M3, the microcontroller 110 generates 18 PWM signal 131. In one example, the microcontroller 110 only includes eight PWM modules 125. With each PWM module 125 capable of generating two PWM signals, the set of eight PWM modules can generate at most 16 PWM signals 131, not 18 as are required in the example of FIG. 1.

To provide the additional two PWM signals, the PWM synthesis circuit 130 of the microcontroller 110 synthesizes a pair of PWM signals (PWMB_U and PWMB_D) based on a PWM signal generated by one of the PWM modules 125 (PWMA2). The two synthesized PWM signals PWMB_U and PWMB_D are shown in this example as controlling the UP transistor Q21 and the DOWN transistor Q22 for motor M3.

Figure 2:
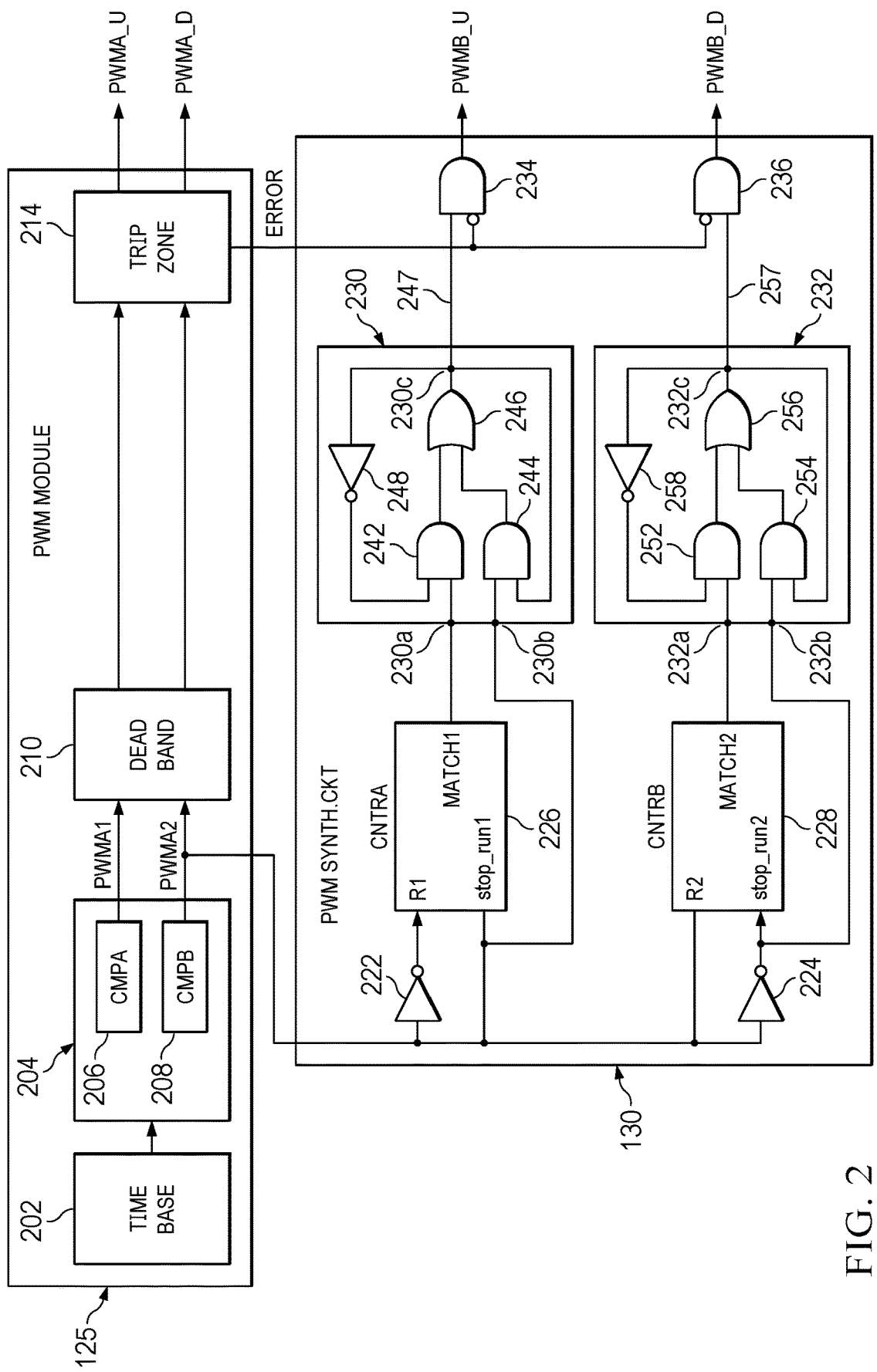
FIG. 2 is a schematic diagram of a PWM synthesis circuit within the microcontroller by which a pair of PWM signals are synthesized from a PWM signal generated by a PWM generator, in accordance with an example.

FIG. 2 is a circuit showing an example implementation of a PWM module 125 and the PWM synthesis circuit 130. In one embodiment, the PWM synthesis circuit 130 is implemented using a configurable logic block (CLB) module that can be configured to implement logic gates, counters, etc. In another embodiment, the PWM synthesis circuit 130 is implemented in discrete (non-configurable) form on an integrated circuit.

The PWM module 125 includes a time base 202, a comparator module 204 (which includes comparators CMPA 206 and CMPB 208), a dead band 210, and a trip zone 214. The time base 202 is a counter that starts from, for example, zero, and increments until a period value is reached, at which point the time base then decrements count value back to zero, and the counting process repeats to generate the period of the PWM signal. Each comparator 206 and 208 has its own compare value. The comparators compare the input count value from the time base 202 to the compare value of the respective comparator. In response to the input count value from the time base 202 reaching the count value for a given comparator (CMPA or CMPB), the comparator generates an event to set or clear the PWM signal output by the comparator. The dead band circuit 210 ensures that there is a sufficiently long dead-time between the PWM signals. The trip zone circuit 214 detects one or more fault conditions such as over-current and/or over-voltage and actively asserts an error signal, ERROR, in response to the detection of such a fault condition. In one implementation, ERROR is nominally logic low (no fault condition) and is asserted to a logic high state in response to the detection of a fault. Alternatively, the trip zone circuit 214 can implement ERROR with the opposite polarity (normally logic high for a no-fault condition, and asserted low in response to the detection of a fault condition). The trip zone circuit 214 may disable the PWM signal PWMA_U and PWMA_D in response to the detection of a fault condition. Otherwise (no fault condition detected), the trip zone circuit 214 provides the output PWM signals PWMA_U and PWMA_D to the drivers for the respective transistors. One of the PWM signals (e.g., PWMA2) before the dead-time is inserted is used as an input to the PWM synthesis circuit 130.

In the example of FIG. 2, the PWM synthesis circuit 130 includes inverters 222 and 224, counters CNTRA 226 and CNTRB 228, logic circuit 230, logic circuit 232, and AND gates 234 and 236. The inputs of inverters 222 and 224 receive the PWMA2 signal from the PWM module 125. Each of the counters CNTRA 226 and CNTRB 228 is configured to be an "up" counter that, when enabled, increments a count value upon each cycle of a clock generated internal to the respective counter. Counter CNTRA 226 has a "stop_run1" input which is an enable input. The counter is enabled when stop_run1 is logic high and the counter is disabled when stop_run1 is logic low. The PWMA2 signal is provided to the stop_run1 input. The R1 input is a reset input. When R1 is asserted high, the internal count value of the counter is reset to a reset value (e.g., 0). When R1 is pulled low, the counter is not reset, and the counter is permitted to advance its count value if the counter is enabled. The output of inverter 222 is coupled to the R1 input. Counter CNTRB 228 is similarly configured and includes an enable stop_run2 input and a reset input R2, which control the operation of counter CNTRB 228 the same as for counter CNTRA 226. The PWMA2 signal is coupled to the reset input R2 of counter CNTRB 228, and the output of inverter 224 is coupled to the stop_run2 input.

A match value is configured into each counter. The match value ensures an appropriate amount of dead-time is inserted into the transitions between PWMB_U and PWMB_D to ensure that PWMB_U and PWMB_D do not turn on their respective transistors at the same time. The match value can be set based on the frequency of the internal clock that the counters are counting. In one example, the frequency of the internal clock is 100 MHz, and the match value is 0xC8h (which implements a dead-time of approximately 2 microseconds). In response to the count value of counter CNTRA 226 reaching the match value, that counter generates a one-shot pulse on its match output, MATCH1. Similarly, in response to the count value of counter CNTRBA 228 reaching the match value, that counter generates a one-shot pulse on its match output, MATCH2.

Logic circuit 230 includes logic circuit inputs 230a and 230b and a logic circuit output 230c. The logic circuit 230 includes AND gates 242 and 244, an OR gate 246, and an inverter 248. The MATCH1 output of counter CNTRA 226 is coupled to the logic circuit input 230a, which also is an input of AND gate 242. The output of OR gate 246 is coupled to an input of inverter 248, and the output of inverter 248 is coupled to the other input of AND gate 242. The PWMA2 signal is coupled to an input of AND gate 244 via logic circuit input 230b. The output of OR gate 246 is also coupled to the other input of AND gate 244. The outputs of AND gates 242 and 244 are coupled to inputs of OR gate 246, and thus OR gate 246 logically ORs the output signals of AND gates 242 and 244. The output signal from the OR gate 246 is a synthesized PWM signal 247 and is provided on the logic circuit output 230c.

The AND gate 234 logically ANDs the synthesized PWM signal 247 from the OR gate 246 with (via an inverting input to the AND gate 234 or a separate inverter) the ERROR signal from the trip zone circuit 214. Accordingly, in response, to the trip zone circuit 214 detecting a fault condition (e.g., over-current, over-voltage, etc.), the trip zone circuit 214 asserts ERROR high. The AND gate 234 responds to a high assertion of ERROR by forcing PWMB_U low thereby preventing the transistor controlled by the PWMB_U signal (transistor Q21 in the example of FIG. 1) from turning "ON."

Logic circuit 232 includes logic circuit inputs 232a and 232b and a logic circuit output 232c. The logic circuit 232 is similarly configured and the AND gate 236 functions similar to AND gate 234. Logic circuit 232 includes AND gates 252 and 254, an OR gate 256, and an inverter 258. The MATCH2 output of counter CNTRB 228 is coupled to the logic circuit input 232a, which also is an input of AND gate 252. The output of OR gate 256 is coupled to an input of inverter 258, and the output of inverter 2548 is coupled to the other input of AND gate 252. The output of inverter 224 (whose signal is the logical inverse of PWMA2) is coupled to an input of AND gate 254 via logic circuit input 232b. The output of OR gate 256 is also coupled to the other input of AND gate 254. The outputs of AND gates 252 and 254 are coupled to inputs of OR gate 256, and thus OR gate 256 logically ORs the output signals of AND gates 252 and 254. The output signal from the OR gate 256 is a synthesized PWM signal 257 and is provided on the logic circuit output 232c.

The AND gate 236 ANDs the synthesized PWM signal 257 from the OR gate 256 with (via an inverting input to the AND gate 254 or a separate inverter) the ERROR signal from the trip zone circuit 214. Accordingly, in response, to the trip zone circuit 214 detecting a fault condition, the trip zone circuit 214 asserts ERROR high and the AND gate 236 responds by forcing PWMB_D low thereby preventing the transistor controlled by the PWMB_U signal (transistor Q22 in the example of FIG. 1) from turning "ON."

Figure 3:
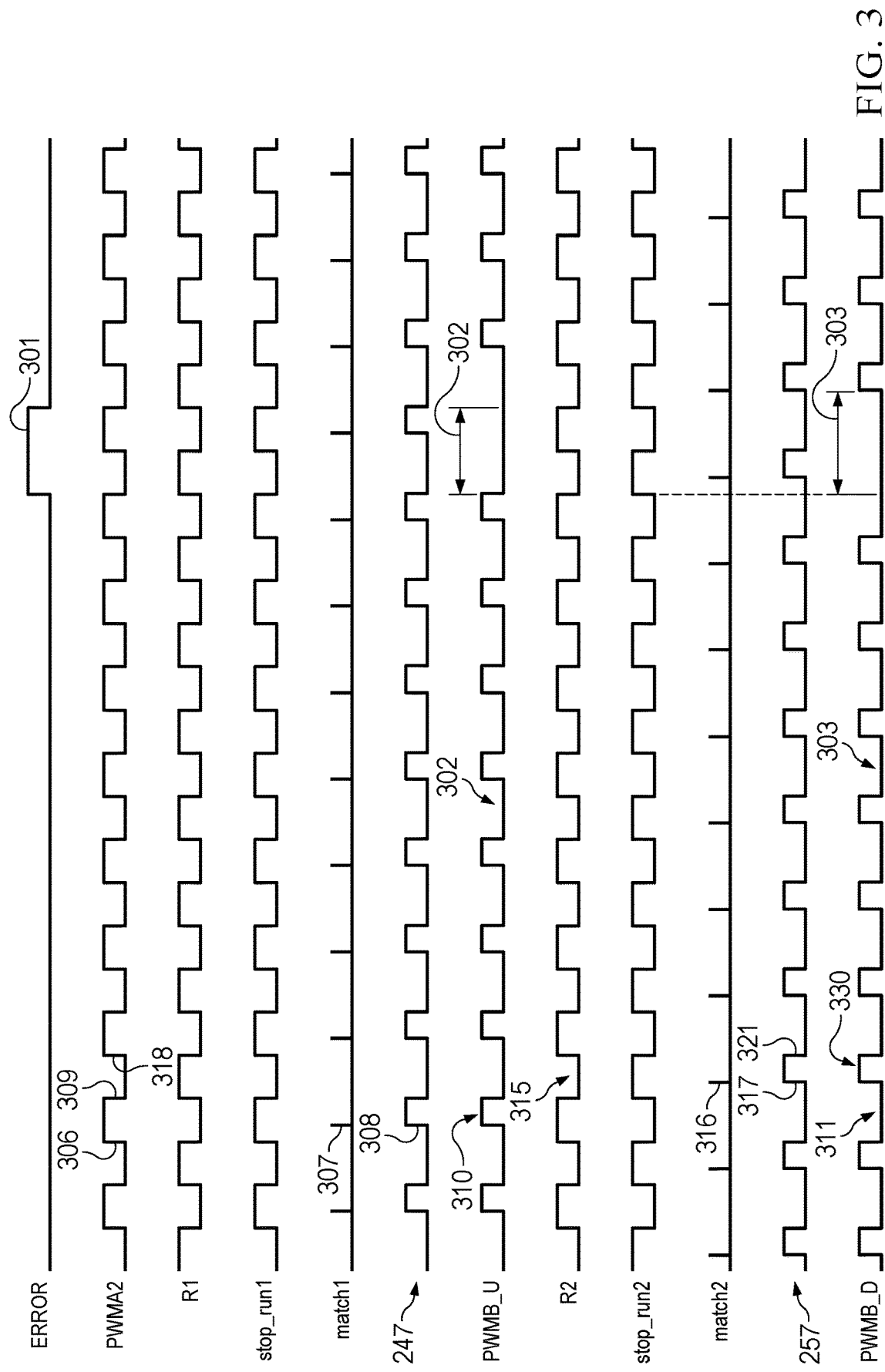
FIG. 3 is a timing diagram of signals shown in the schematic of FIG. 2, in accordance with an example.

FIG. 3 is a timing diagram illustrating some of the signals shown in the schematic of FIG. 2. FIGS. 2 and 3 are now discussed. Multiple cycles of the following signals are illustrated in the example timing diagram of FIG. 3 including ERROR, PWMA2, R1, stop_run1, MATCH1, PWM signal 247, PWMB_U, R2, stop_run2, MATCH2, PWM signal 257, and PWMB_D.

ERROR is low for most of the timing diagram until point 301 at which time the trip zone circuit 214 detected a fault and asserted ERROR high. In response to ERROR being high, both the PWMB_U and PWMB_D signals are forced low (as indicated at 302 and 303) by their respective AND gates 234 and 236, as described above.

The following explanation describes the operation of the PWM synthesis circuit 130 in response to each high assertion of PWMA2. Reference numeral 306 identifies the rising edge of one of the cycles of PWMA2. In response to PWMA2 being high, the stop_run1 input of the counter becomes logic high, and the output of inverter 212 becomes logic low thereby forcing the reset R1 input of counter CNTRA 226 to be low. With the stop_run1 being high and R1 being low, counter CNTRA 226 begins to count its internal clock.

In response to the count value reaching the match value (e.g., 0xC8), counter CNTRA 226 generates a one-shot pulse 307 on its MATCH1 output. When the one-shot pulse 307 occurs, PWM signal 247 is logic low which causes the output of inverter 248 to become logic high. With both inputs to AND gate 242 being logic high, the output from AND gate 242 to OR gate 246 is logic high, and in turn the output of OR gate 246 (PWM signal 247) becomes logic high (rising edge identified by reference numeral 308).

At this point (rising edge of PWM signal 247), both inputs to AND gate 244 are logic high (PWMA2 and PWM signal 247 are logic high), which reinforces the logic high of PWM signal 247 through OR gate 246. PWM signal 247 remains logic high until the falling edge of PWMA2 occurs (reference numeral 309). The PWM output signal from the PWM synthesis circuit 130 is PWMB_U which is identical to PWM signal 247 (unless the ERROR signal is asserted high as described above). During the logic high pulse 310 of PWMB_U, PWMB_D is logic low as identified by reference numeral 311.

In response to a falling edge of PWMA2 (309), due to inverter 212 the R1 reset input to counter CNTRA 226 is asserted high thereby resetting the counter. The lower signal chain of the PWM synthesis circuit 130, however, provides PWMA2 to the R2 and stop_run2 inputs of counter CNTRB 228 with the opposite polarity than for counter CNTRA 226. The opposite logic polarity causes the R2 input to counter CNTRB 228 to be logic low (reference numeral 315) and the corresponding stop_run2 input to be logic high as shown. Counter CNTRB 228 is thus caused to begin counting.

Counter CNTRB 226 generates a one-shot pulse 316 on its output MATCH2 in response to the count value of counter CNTRB 226 reaching its match value (e.g., 0xC8).

Logic circuit 232 responds in a similar fashion to that described above with regard to logic circuit 230. In response to MATCH2 being asserted high, both inputs to AND gate 242 at that point are logic high, and through OR gate 256, PWM signal 257 has a rising edge (reference numeral 317). The logic high level of PWM signal 257 is provided on the input of AND gate 254 and, through inverter 224, the other input of OR gate 254 also is logic high. Both inputs to AND gate 254 being logic high causes the PWM signal 257 to remain logic high until the next rising edge of PWMA2 (reference numeral 318). Through inverter 224, a logic high of PWMA2 becomes a logic low into the AND gate 254, which then causes a falling edge for PWM signal 257. The positive pulse for the PWM signal 257 causes a positive pulse 330 for PWMB_D.

The time between the falling edge of pulse 310 for PWMB_U and the next rising edge of PWMB_D is approximately equal to the elapsed time counted by counter CNTRB 228 until it reaches its match value (e.g., 0xC8). Similarly, the time between the falling edge of pulse 330 for PWMB_D and the next rising edge of PWMB_U is approximately equal to the elapsed time counted by counter CNTRA 226 until it reaches the match value. The counters CNTRA 226 and CNTRB 228 thus implement a dead-time for the PWM signals PWMB_U and PWMB_D to ensure their respective transistors are not ON at the same time (which otherwise would cause a potentially damaging shoot-through current to occur).

Figure 4:
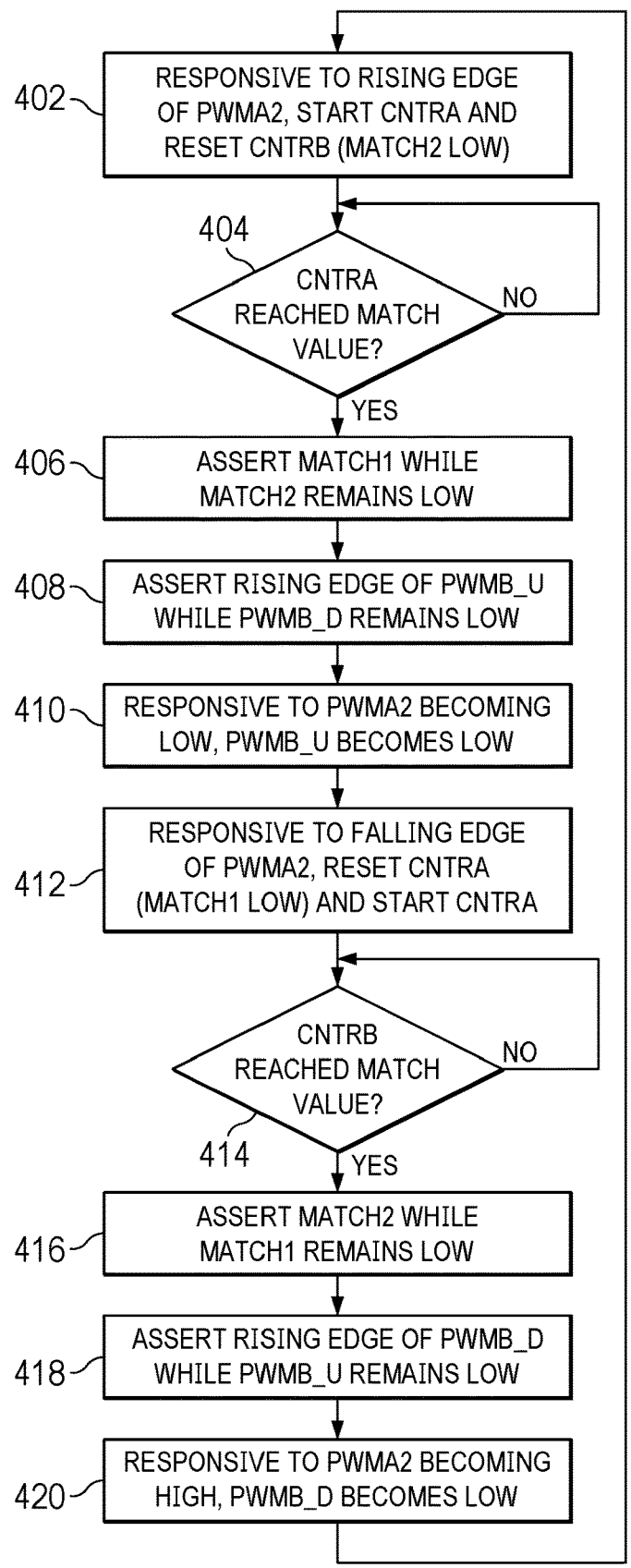
FIG. 4 is a flowchart of a method for synthesizing a pair of PWM signals from one PWM signal, in accordance with an example.

FIG. 4 is a flow chart illustrating an example method performed by the PWM synthesis circuit 130. At step 402, the method includes starting the counter CNTRA 226 and resetting the counter CNTRB 228 in response to a rising edge of PWMA2. Holding the counter CNTRB in a reset state forces the output MATCH2 to be logic low. With MATCH2 being low and the output signal from inverter 224 also being low (due to PWMA2 being high), the PWM signal 257 and PWMB_D are both low.

As described above, with PWMA2 being logic high, counter CNTRA 226 begins to count and continues counting until its count value reaches the match value (decision step 404). In response to the counter CNTRA reaching the match value, the method includes at step 406 asserting MATCH1 (e.g., logic high), while MATCH2 continues to remain logic low. At step 408, a rising edge is asserted for PWMB_U while PWMB_D remains logic low.

At step 410, upon the ensuing falling edge of PWMA2, PWMB_U is forced low terminating the logic high pulse of PWMB_U. Also, in response to PWMA2 becoming logic low, counter CNTRA 226 is reset (which forces its output MATCH1 to be logic low) and counter CNTRB 228 is started and begins to count. Holding the counter CNTRA in a reset state forces the output MATCH1 to be logic low. With MATCH1 and PWMA2 both being low, the PWM signal 247 and PWMB_U are both low.

With PWMA2 being logic low (and thus output signal from inverter 224 begin logic high), counter CNTRB 228 begins to count and continues counting until its count value reaches the match value (decision step 414). In response to the counter CNTRB reaching the match value, the method includes at step 416 asserting MATCH2 (e.g., logic high), while MATCH1 continues to remain logic low. At step 418, a rising edge is asserted for PWMB_D while PWMB_U remains logic low. At step 420, upon the ensuing rising edge of PWMA2, PWMB_D is forced low terminating the logic high pulse of PWMB_D. The method continues at step 402 and the process repeats.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after the time of manufacture, for example, by an end-user and/or a third-party.

While the use of particular transistors is described herein, other transistors (or equivalent devices) may be used instead. For example, a p-channel field effect transistor ("PFET") may be used in place of an n-channel field effect transistor (NET) with little or no changes to the circuit. Furthermore, other types of transistors may be used (such as bipolar junction transistors (BJTs)).

In this description, unless otherwise stated, "about," "approximately" or "substantially" preceding a parameter means being within +1-10 percent of that parameter.

Modifications are possible in the described embodiments, and other embodiments are possible, within the scope of the claims.

What is claimed is:

1. An integrated circuit (IC), comprising:
a pulse width modulation (PWM) generator configured to generate a first PWM signal;
a first counter having a first control input and a first reset input, the first control input configured to receive the first PWM signal, and the first reset input configured to receive a logical inverse of the first PWM signal, the first counter having a first counter output;

a second counter having a second control input and a second reset input, the second control input configured to receive the logical inverse of the first PWM signal, and the second reset input configured to receive the first PWM signal, the second counter having a second counter output;

a first logic circuit having a first logic circuit input and a second logic circuit input, the first logic circuit input coupled to the first counter output, and the second logic circuit input configured to receive the first PWM signal, the first logic circuit having a first logic circuit output configured to provide a second PWM signal; and a second logic circuit having a third logic circuit input and a fourth logic circuit input, the third logic circuit input coupled to the second counter output, and the fourth logic circuit input configured to receive the logical inverse of the first PWM signal, the second logic circuit having a second logic circuit output configured to provide a third PWM signal.

2. The IC of claim 1, further comprising a first AND gate having first and second AND gate inputs, the first AND gate input coupled to the first logic circuit output, and the second AND gate input configured to receive an error signal.

3. The IC of claim 2, wherein, when asserted, the error signal indicates occurrence of at least one of an over-current or over-voltage condition.

4. The IC of claim 2, further comprising a second AND gate having third and fourth AND gate inputs, the third AND gate input coupled to the second logic circuit output, and the fourth AND gate input configured to receive the error signal.

5. The IC of claim 1, wherein the first logic circuit comprises:
a first logic gate having a first logic gate first input coupled to the first counter output, and having a first logic gate second input;
a second logic gate having a second logic gate first input configured to receive the first PWM signal, and having a second logic gate second input;
a third logic gate having an input coupled to an output of the first logic gate, and having another input coupled to an output of the second logic gate, wherein an output of the third logic gate is coupled to the second logic gate second input; and
a fourth logic gate having an input coupled to an output of the third logic gate, the fourth logic gate having an output coupled to the first logic gate second input.

6. The IC of claim 5, wherein:
the first logic gate is an AND gate;
the second logic gate is an AND gate;
the third logic gate is an OR gate; and
the fourth logic gate is an inverter.

7. The IC of claim 1, wherein:
the first counter is configured to begin counting pulses of a first clock in response to an assertion of a signal received on the first control input until a count value of the first counter reaches a match value, at which time the first counter is configured to generate a one-shot pulse on the first counter output; and
the second counter is configured to begin counting pulses of a second clock in response to an assertion of a signal received on the second control input until a count value of the second counter reaches a match value, at which time the second counter is configured to generate a one-shot pulse on the second counter output; and
the signal received on the second control input is configured to be a logical inverse of the signal received on the first control input.

8. The IC of claim 1, further comprising:
a first inverter having an input configured to receive the first PWM signal, and having an output coupled to the first reset input; and
a second inverter having an input configured to receive the first PWM signal, and having an output coupled to the second control input.

9. A system, comprising:
a direct current (DC)-to-alternating current (AC) inverter having a microcontroller input and a motor output;
a pulse width modulation (PWM) module having a first output coupled to the microcontroller input of the DC-to-AC inverter, the first output configured to provide first and second complementary PWM signals to the DC-to-AC inverter; and
a PWM synthesis circuit configured to provide third and fourth complementary PWM signals to the microcontroller input of the DC-to-AC inverter, the PWM synthesis circuit comprising:
a first counter having a first control input and a first reset input, the first control input configured to receive the at least one first and second complementary PWM signal, and the first reset input configured to receive a logical inverse of the at least one first and second complementary PWM signal, the first counter having a first counter output;
a second counter having a second control input and a second reset input, the second control input configured to receive the logical inverse of the at least one first and second complementary PWM signal, and the second reset input configured to receive the at least one first and second complementary PWM signal, the second counter having a second counter output;
a first logic circuit having a first logic circuit input and a second logic circuit input, the first logic circuit input coupled to the first counter output, and the second logic circuit input configured to receive the at least one first and second complementary PWM signal, the first logic circuit having a first logic circuit output configured to provide the third complementary PWM signal; and
a second logic circuit having a third logic circuit input and a fourth logic circuit input, the third logic circuit input coupled to the second counter output, and the fourth logic circuit input configured to receive the logical inverse of the at least one first and second complementary PWM signal, the second logic circuit having a second logic circuit output configured to provide the fourth complementary PWM signal.

10. The system of claim 9, further comprising a first AND gate having first and second AND gate inputs, the first AND gate input coupled to the first logic circuit output, and the second AND gate input configured to receive an error signal.

11. The system of claim 10, wherein, when asserted, the error signal indicates occurrence of at least one of an over-current or over-voltage condition.

12. The system of claim 10, further comprising a second AND gate having third and fourth AND gate inputs, the third AND gate input coupled to the second logic circuit output, and the fourth AND gate input configured to receive the error signal.

13. The system of claim 9, wherein the first logic circuit comprises:
a first logic gate having a first logic gate first input coupled to the first counter output, and having a first logic gate second input;

a second logic gate having a second logic gate first input configured to receive the at least one first and second complementary PWM signal, and having a second logic gate second input;

a third logic gate having an input coupled to an output of the first logic gate, and having another input coupled to an output of the second logic gate, wherein an output of the third logic gate is coupled to the second logic gate second input; and a fourth logic gate having an input coupled to an output of the third logic gate, the fourth logic gate having an output coupled to the first logic gate second input.

14. The system of claim 13, wherein:
the first logic gate is an AND gate;
the second logic gate is an AND gate;
the third logic gate is an OR gate; and
the fourth logic gate is an inverter.

15. The system of claim 9, wherein the motor output of the DC-to-AC inverter is adapted to be coupled to a multi-phase motor.

16. The system of claim 9, further comprising:
a first inverter having an input configured to receive the at least one first and second complementary PWM signal, and having an output coupled to the first reset input; and
a second inverter having an input configured to receive the at least one first and second complementary PWM signal, and having an output coupled to the second control input.

* * * * *